J. HAJDUK.
VEHICLE JACK AND TURN TABLE.
APPLICATION FILED DEC. 12, 1914.
1,139,516.
Patented May 18, 1915.
3 SHEETS—SHEET 2.
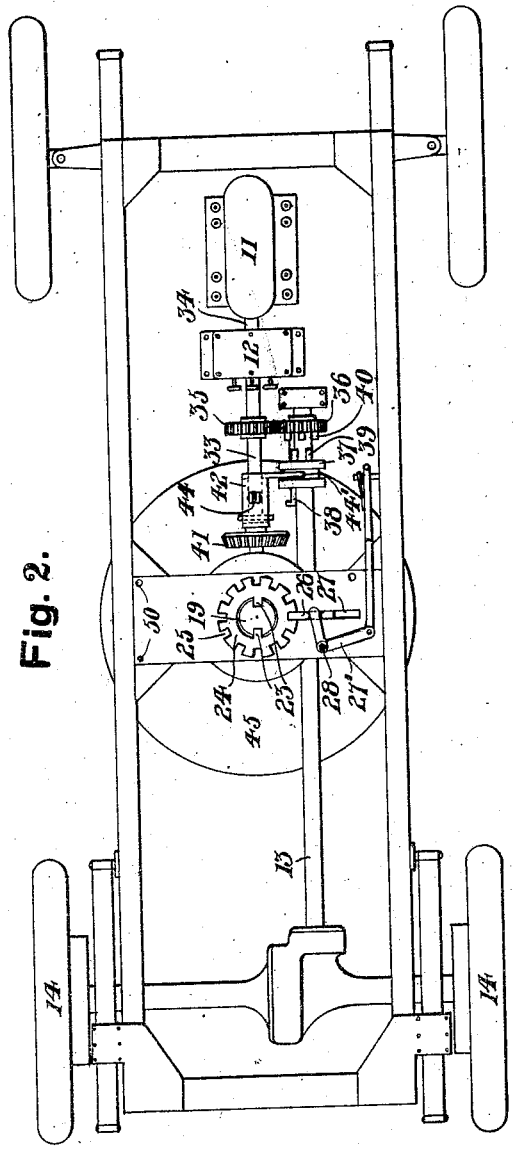
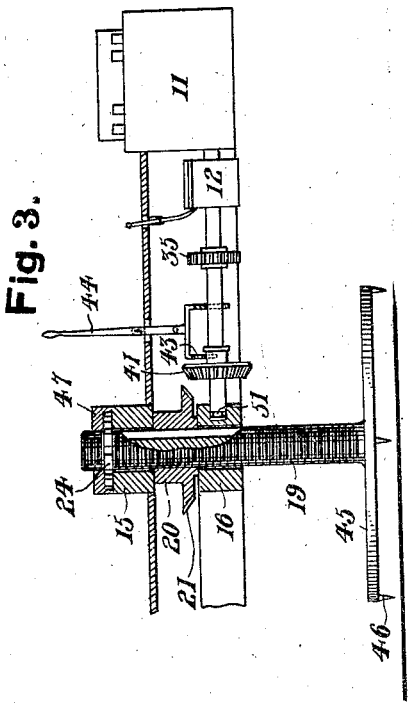
Witnesses
R. B. Takach
D. K. L. Bryant.
Inventor
J. Hajduk
By
A. M. Wilson
Attorney J. HAJDUK.
VEHICLE JACK AND TURN TABLE.
APPLICATION FILED DEC. 12, 1914.
1,139,516.
Patented May 18, 1915.
3 SHEETS—SHEET 3.
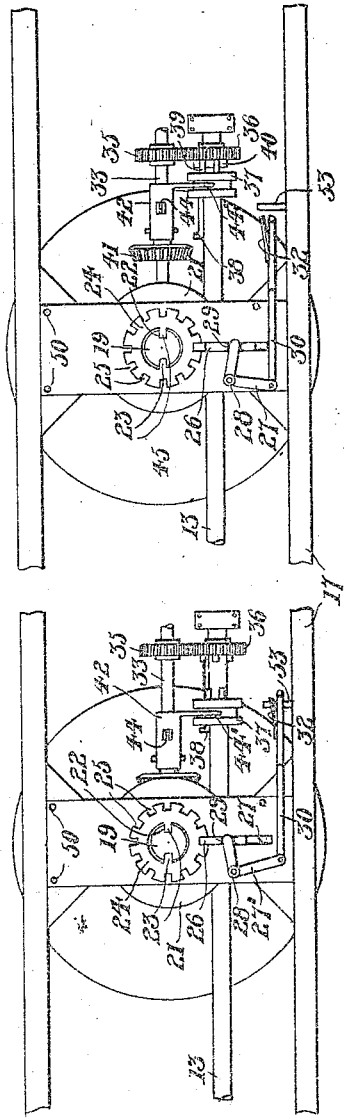
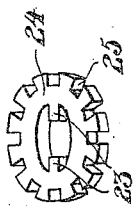
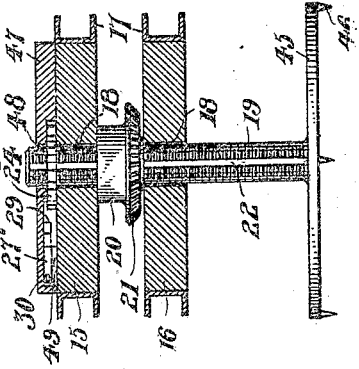
Witnesses
R. B. Takach
Inventor
J. Hajduk
By
Attorney

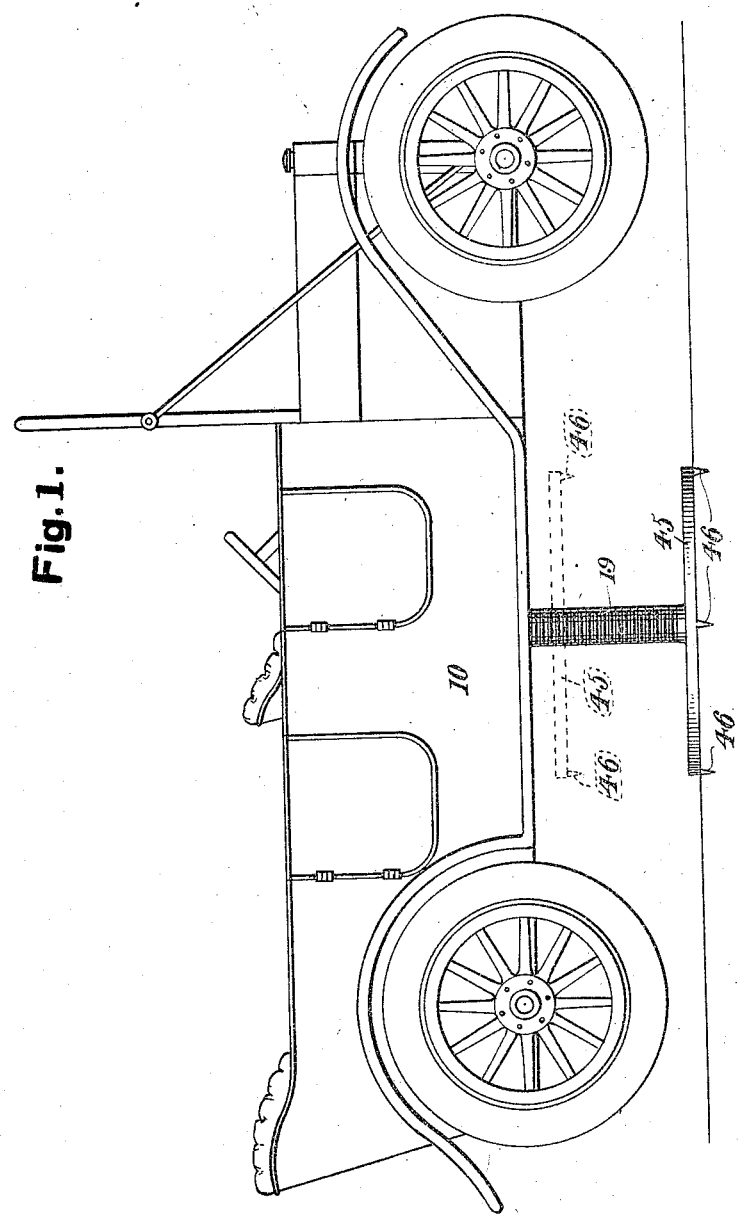

UNITED STATES PATENT OFFICE.

JOHN HAJDUK, OF FAYETTE CITY, PENNSYLVANIA.

VEHICLE JACK AND TURN-TABLE.

1,139,516.  Specification of Letters Patent.  Patented May 18, 1915.

Application filed December 12, 1914. Serial No. 876,999.

*To all whom it may concern:*

Be it known that I, JOHN HAJDUK, subject of the Emperor of Austria-Hungary, residing at Fayette City, in the county of Fayette and State of Pennsylvania, have invented certain new and useful Improvements in Vehicle Jack and Turn-Tables, of which the following is a specification.

This invention relates to certain new and useful improvements in vehicle jacks and turn tables.

The primary object of this invention is to provide a combined lifting jack and turn table that is permanently secured to a vehicle, and particular a motor vehicle, whereby the vehicle may be elevated and revolved when it is impossible to turn the same on a narrow street or road by the usual forward motion of the vehicle.

A further object is to provide a jack-screw device carried by the frame of vehicles and operable by a motor for elevating and lowering the vehicle as desired, while the latter may be readily turned around rotarily upon the jack when the vehicle is in its elevated position.

A still further object is to provide a motor vehicle with a substantially centrally positioned jack screw having operative connections with the motor whereby the screw may be moved outwardly and inwardly of the vehicle frame for changing the vertical position of the vehicle, while a releasing means is provided for allowing the vehicle to be turned rotarily upon the jack screw when the vehicle is elevated.

With these general objects in view and others that will appear as the nature of the invention is better understood, the same consists in the novel combination and arrangement of parts hereinafter more fully described, illustrated in the accompanying drawings and set forth in the appended claims.

In the drawings forming a part of this application and in which like-designating characters refer to corresponding parts throughout the several views, Figure 1 is a side elevation of the device illustrated in its elevated position and with the jack screw shown in dotted lines as normally positioned. Fig. 2 is a top plan view of the same with the vehicle body removed and the casing for the releasing mechanism also removed, the clutching mechanism being shown in its neutral position. Fig. 3 is a vertical longitudinal sectional view taken in the plane of the jack screw. Fig. 4 is a detail plan view of the operative portion of the device with the jack screw illustrated operatively clutched to the motor driving means. Fig. 5 is a similar view showing the jack screw released and the vehicle power shaft operatively clutched to the motor. Fig. 6 is a vertical sectional view transversely of the vehicle and upon the plane of the jack screw. Fig. 7 is an enlarged perspective view of the locking disk of the jack screw. Fig. 8 is a perspective view of the disk engaging the bolt and Fig. 9 is an enlarged perspective view of the bolt actuating means.

Referring more in detail to the drawings, it will be noted that the present device while applicable to any form of vehicle is herein illustrated as being installed upon an automobile 10 and having a motor 11 for driving the same and being provided with any form of change speed and direction gearing within the casing 12, for regulating the revolutions of the vehicle power shaft 13 and by which the rear traction wheels 14 of the vehicle are propelled as, will be readily understood.

Transversely positioned spaced parallel sills 15 and 16 are positioned substantially central of the vehicle frame 17 and through alining vertical perforations 18 of which a jack screw 19 is freely positioned. An operating nut 20 is screw threaded upon the jack screw 19 between the sills 15 and 16 and is provided with a beveled toothed flange 21 adapted for operative connection with the motor 11 in the manner hereinafter described. The jack screw is provided with opposite longitudinal slots 22 in which are slidably positioned inwardly projecting lugs 23 of the locking disk 24 which is freely mounted upon the jack screw being seated upon the top of the upper sill 15. The said disk is provided with peripheral teeth 25 adapted to be engaged by a slidable lock bolt 26 positioned in a central longitudinal groove 27 of the said sill 15.

An angular operating lever 27' is pivoted as at 28 to the upper sill 15 and has one end thereof positioned in sliding engagement within the transverse notch 29 of the lock bolt, while the other end of the lever has an operating rod 30 pivotally connected thereto and provided with a terminal handle 31 adapted to be grasped for moving the lever and bolt. A spring 32 secured at one end to the rod 30 retains the said rod normally projected and the bolt in locking engagement with one of the notches of the disk 24, while the other end of the springs is provided with a hook 52 adapted to removably engage the post 53 of the vehicle frame.

A stub shaft 33 positioned longitudinal and substantially central of the vehicle frame has one end journaled in a thrust bearing 51 of the sill 16 and said stub shaft has adjustably geared connections with the engine driving shaft 34 by means of the speed and direction changing gearing within the casing 12, while a gear 35 secured to the said stub shaft 33 is in constant mesh with a similar gear 36 which is freely journaled upon the vehicle power shaft 13. A clutch collar 37 is slidably mounted upon the power shaft 13 and being made revoluble therewith by means of the spline 38 so that the interengagement of the clutch fingers 39 of the member 37 with the clutch fingers 40 of the gear 36 will lock the gear 36 with the shaft 13. A pinion 41 is slidably splined to the stub shaft 33 and is adapted to mesh with the teeth of the beveled flange 21 of the jack screw operating nut 20. A shiftable bracket 42 of angular form is slidably mounted upon the stub shaft 33 and has one fork 43 freely connected with the pinion 41 and another fork 44' freely connecting the clutch member 37 while a clutch lever 44 is pivoted to the said bracket for moving the same longitudinally of the vehicle. From this arrangement it will be seen that when the pinion 41 and clutch member 37 are out of contact with their co-operating members as shown in Fig. 2, the entire construction will be inoperative so that a driving of the stub shaft by the motor 11 will only revolve the journaled gear 36 and the splined pinion 41 without influencing either the nut 20 or the power shaft 13. Upon moving the lever 44 forwardly, the bracket 42 will be rewardly influenced thus moving the pinion 41 in mesh with the nut teeth 21, while the clutch member 37 will be farther removed from the power shaft gear 36 and the turning of the motor will turn the stub shaft 33 in whichever direction is desired under the control of the change gears within the casing 12. The lower end of the jack screw is provided with a circular disk or base 45 having projecting teeth 46 upon the bottom thereof and adapted to engage the road-bed or other surface upon which the vehicle is positioned. When the screw base is normally positioned with the jack-screw retracted and as illustrated in dotted lines in Fig. 1, a meshing of the pinion 41 and the nut teeth 21 being effected, the stub shaft 33 may be turned by the motor in the desired direction for turning the nut 20 to downwardly shift the jack-screw and its base until the latter engages the ground as illustrated in Fig. 1 and whereupon a farther turning of the nut 20 will elevate the vehicle upon the said screw. A reversing in direction of the stub shaft 33 through the agency of the change direction gears will result in turning the nut 20 in the opposite direction and thus lowering the automobile to the roadway and thereafter a retracting of the screw to its original normal position. During the use of the jack-screw as above described, the lock bolt 26 is held engaged with one of the teeth of the disk 24 by means of the spring 32 and when it is desired to turn the vehicle around upon the said screw as a pivot at any time that the vehicle is elevated thereon, the handle 31 may be pushed inwardly which releases the bolt from the lock disk and whereupon the vehicle may be manually swung around after the manner of a turn table and thus readily positioned in any desired direction. The casing 47 is mounted upon the top of the sill 15 and has a central opening 48 for receiving the upper end of the jack-screw while the lever 27' as well as the bolt and the pivoted end of the lever 30 are housed in a chamber 49 thereof, while the casing is secured to the said sill by means of holdfast devices projecting within sockets 50 of the sill.

While the form of the invention herein shown and described is what is believed to be the preferred embodiment thereof, it is nevertheless to be understood that minor changes may be made without departing from the spirit and scope of the invention as claimed.

What I claim as new is:—

1. A device of the class described comprising a vehicle having spaced transverse sills positioned one above the other and provided with alining openings therethrough, a jack screw freely slidable within the said openings, an operating nut between the said sills and threaded upon the said screw, and provided with a toothed flange, a ground-engaging base plate upon the lower end of the said screw, a motor, clutching means between the said motor and toothed flange and direction changing means for the said clutching means.

2. A device of the class described comprising a vehicle having spaced transverse sills positioned one above the other and provided with alining openings therethrough, a jack screw freely slidable within the said openings, an operating nut between the said sills and threaded upon the said screw, and provided with a toothed flange, a ground-engaging base plate upon the lower end of the said screw, a motor, a stub shaft, direction changing means between said motor and shaft, a slidable pinion splined to the said shaft adapted to mesh with the said toothed flange and shifting means for the said pinion.

3. A device of the class described comprising a vehicle having spaced transverse sills positioned one above the other and provided with alining openings therethrough, a jack screw freely slidable within the said openings, an operating nut between the said sills and threaded upon the said screw, and provided with a toothed flange, a ground-engaging base plate upon the lower end of the said screw, a motor, a stub shaft, direction changing means between said motor and shaft, a slidable pinion splined to the said shaft adapted to mesh with the said toothed flange, shiftable means for the said pinion, the said screw provided with longitudinal slots therein, a disk having inwardly projecting lugs slidably engaging within the said slots and also having peripheral teeth, a lock bolt slidably mounted upon one of said sills and normally engaging the said disk, and releasing means for the said bolt.

4. A device of the class described comprising a vehicle having spaced transverse sills positioned one above the other and provided with alining openings therethrough, a jack screw freely slidable within the said openings, an operating nut between the said sills and threaded upon the said screw, and provided with a toothed flange, a ground-engaging base plate upon the lower end of the said screw, a motor, a stub shaft, direction changing means between the said motor and stub shaft, a slidable pinion splined to the said stub shaft, and adapted to mesh with the said toothed flange, a gear secured to the said stub shaft, a power shaft for the vehicle, a gear freely journaled upon said power shaft in constant mesh with the said stub shaft gear, a slidable clutch member splined upon said power shaft and adapted for interlocking with the said power shaft gear, and simultaneous operating means for the said pinion and clutch member.

In testimony whereof I affix my signature in presence of two witnesses.

JOHN HAJDUK.

Witnesses:
 STEVE RODISH,
 ALEXANDER RONAY.